Aug. 23, 1966  J. P. SELLERS, JR  3,267,726
HEAT FLUX PROBE
Filed Sept. 14, 1961  2 Sheets-Sheet 2
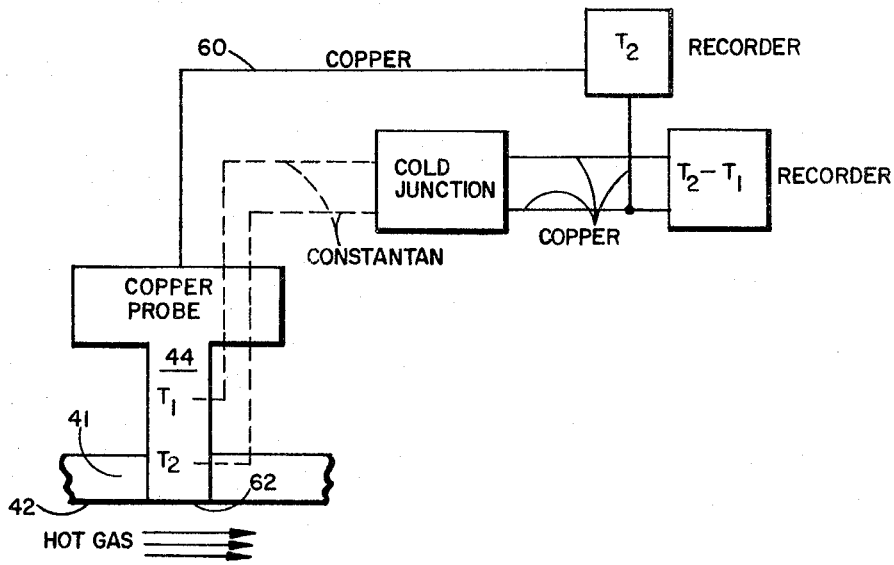
FIG. 7
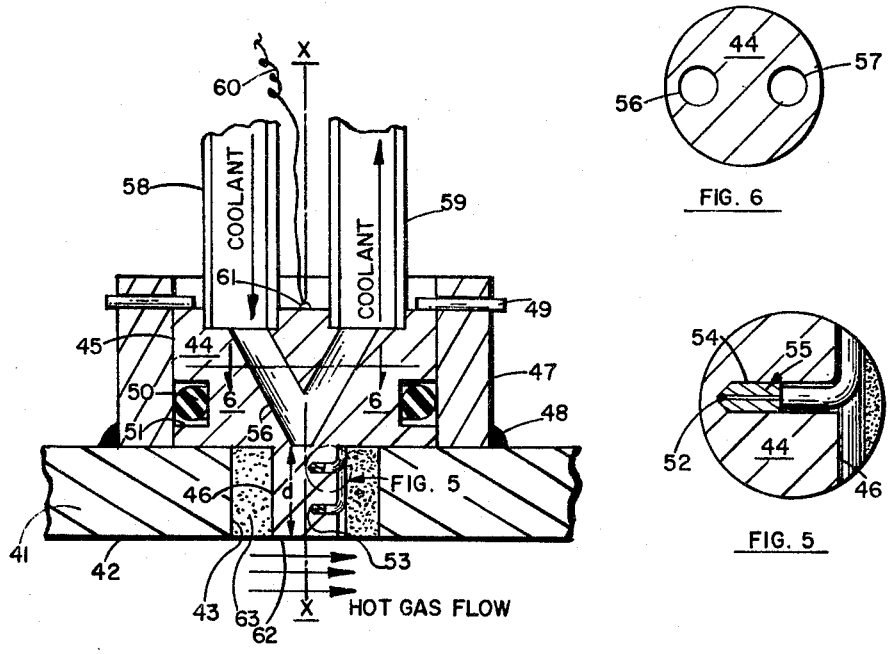
FIG. 6
FIG. 5
FIG. 4
INVENTOR.
JOHN P. SELLERS JR.
BY
Thomas S. Macdonald
ATTORNEY United States Patent Office 3,267,726
Patented August 23, 1966

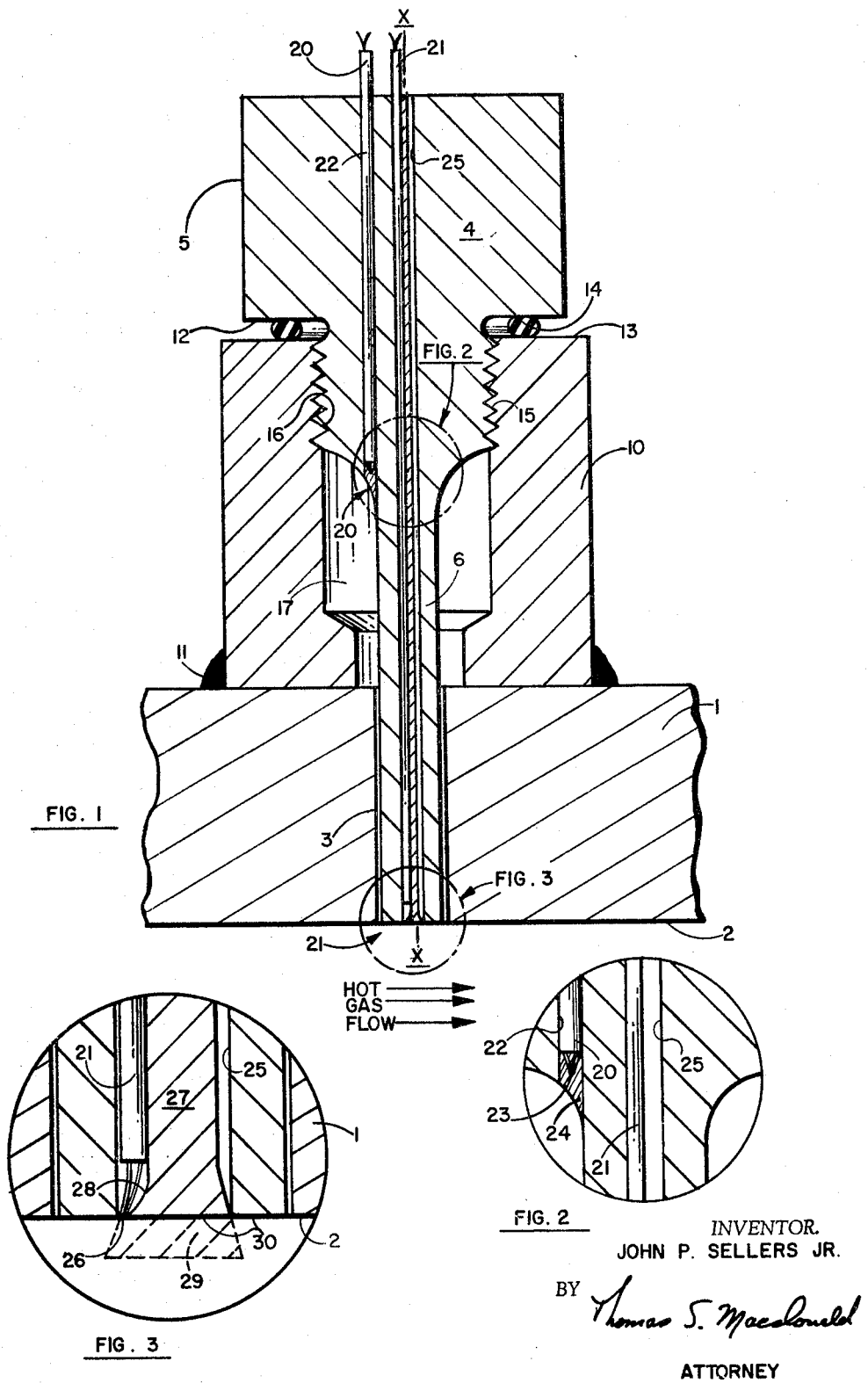

3,267,726
HEAT FLUX PROBE
John P. Sellers, Jr., Canoga Park, Calif., assignor to North American Aviation, Inc.
Filed Sept. 14, 1961, Ser. No. 138,045
3 Claims. (Cl. 73—190)

This invention relates to a heat flux probe and more particularly relates to a heat flux probe of the transducing type which is particularly adapted for sensing the rate of heat transfer through a heated wall member.

Design requirements for devices which include a heated wall member necessitate that such heated wall members be able to cope with the extremely high internal temperatures which are generated therein. Such problems are particularly apparent in closed internal combustion type systems wherein it is desired to precisely evaluate the local gas-side heat transfer coefficients through the walls thereof. In particular, it is of prime importance to the design of any cooling system for such a closed system that the local gas-side heat transfer coefficient ($h_0$) be precisely ascertained pursuant to the calculated values of the heat flux rates.

There does not appear to be a satisfactory method and/or apparatus available for such an analytical determination. Particularly disturbing is the experimental finding that the local heat flux ($Q/A$) may vary significantly at various wall portions on such a closed system due to unpredictable combustion patterns generated by means of particular injector configurations, for example. If a high system reliability is to be achieved, the cooling system used therewith must be designed with prime consideration afforded to the maximum heat flux and not an arbitrary average value thereof.

The present invention has alleviated many of the above stated problems by providing a heat flux probe assembly which is adapted to be constructed and arranged to efficiently function on any particular wall portion of a heated wall member. Such an assembly comprises a probe member having a portion which extends through said heated wall member and terminates in an end portion which is in substantially flush relationship relative to the inner wall of said heated wall member. A first thermocouple means is constructed and arranged in said member and terminates adjacent to said probe end portion. A second thermocouple means is constructed and arranged in said probe member and terminates in said probe at a fixed distance from said first thermocouple means. With such a construction and arrangement the heat transfer rate occurring between the two thermocouple means may be readily obtained.

An object of this invention is to provide a heat flux probe assembly which may be utilized to expeditiously and efficiently determine the heat transfer rate through any particular portion of a heated wall member.

Another object of this invention is to provide a heat flux probe assembly which may be expeditiously attached to a heated wall member.

Still another object of this invention is to provide a heat flux probe assembly which is simple, but yet rugged in construction and affords superior heat transfer sensing functions.

These and other objects of this invention will become apparent from the following description taken in connection with the accompanying drawings, in which:

FIG. 1 is a longitudinal cross-sectional view disclosing a first heat flux probe assembly embodiment;

FIG. 2 is an enlarged view taken at the approximate mid-portion of the heat flux probe assembly of FIG. 1;

FIG. 3 is an enlarged view of the lower-most portion of the heat flux probe assembly of FIG. 1;

FIG. 4 is a longitudinal cross-sectional view disclosing a second heat flux probe assembly embodiment;

FIG. 5 is an enlarged view of one of the thermocouple means employed with the heat flux probe assembly embodiment of FIG. 4;

FIG. 6 is a cross-sectional view taken on lines 6—6 of FIG. 4; and

FIG. 7 is a schematic view of a typical heat transfer measuring means which may be employed with the FIGS. 4–6 heat flux probe assembly embodiment.

FIG. 1 discloses a first embodiment illustrating the novel heat flux probe assembly concepts of this invention. A wall member 1 which may comprise that of a rocket motor or any other like heated wall member provides an inner surface 2 which is adapted to guide a hot gas flow therethrough, as shown. An aperture 3 is formed through the wall member 1 to receive a lower portion of a heat flux probe 4 as will be hereinafter more fully explained.

The heat flux probe assembly of this invention comprises a probe member 4 having a first or base type portion 5 and a second or probe extension type portion 6. Although the probe member 4 preferably comprises a circular cross-section, it is to be understood that any other cross-section may be employed therefor depending on the specific work application. It is to be particularly noted that the second portion 6 of the probe member 4 is preferably formed to comprise relatively small cross-sectional areas (i.e., slender) with respect to the cross-sectional area of the first portion 5, for reasons hereinafter more fully discussed. It has been found in rocket engine applications, for example, that such a relatively small circular cross-section may comprise a diameter within the range of 0.10 to 0.25 inch. It has been further found that the length of probe portion 6 taken along axis X—X should approximate at least four times the diameter of probe portion.

An adapting type, preferably cylindrically shaped, member 10 may be secured to the outer surface of the wall member 1 by any standard securing means, such as a circumferentially extending weld bead 11. The first portion 5 of the probe member 4 preferably comprises a downwardly facing shoulder portion 12 which is adapted to be constructed and arranged in juxtaposed relationship to an upwardly facing surface portion 13 of the support member 10. A conventional type O-ring 14 may be constructed and arranged therebetween to provide for desired shock resisting and sealing functions thereat. Thread means 15 are constructed and arranged on the lower portion of the first portion 5 of the probe member 4 and cooperate with thread means 16 which are formed on the upper internal surface of the support member 10 to provide a securing means thereat. Due to the preferably relatively smaller cross-section of the second portion 6 of the probe member, the aperture formed in support member 10 provides an insulating type chamber 17 therein, between said probe member and the internal walls of the support member 10. Such a chamber may be filled with a standard type of electrical and heat insulation such as asbestos or fiberglass, if so desired. Since it is desirable to prevent disadvantageous radial heat flow with respect to the longitudinal axis X—X of the probe member 4, additionally, the outer surface portions of the lower probe extension portion 6 may be coated with conventional insulation such as standard metal oxide, if so desired.

The heat transfer measuring function is provided by two thermocouple means shown generally as 20 and 21. The thermocouple means 20 is constructed and arranged in an aperture 22 which is formed in substantially parallel relationship with respect to the longitudinal axis X—X of probe member 4. The aperture 22 preferably terminates in exposed relationship to chamber 17. The thermocouple means 20 and 21, per se, are preferably substantially identical in construction and arrangement, and preferably comprise conventional thermocouple wires encased in an insulation such as magnesium oxide. The thermocouple means 20 terminates in a thermocouple junction 23, as more clearly shown in FIG. 2. For ease of fabrication purposes such an above-described construction and arrangement is desirable, i.e., the open area around the thermocouple junction 23 may be filled with a standard metal solder 24 which preferably has similar heat conducting properties to that of probe member 4.

FIG. 3 more particularly discloses a preferred construction and arrangement of the second thermocouple means 21. An aperture 25 is substantially constructed and arranged on the longitudinal axis X—X of the probe member 4 and is preferably slightly larger in diameter than the aperture 22 for reasons hereinafter set forth. The second thermocouple means 21 terminates in a thermocouple junction 26 which is arranged in the relatively slender portion 6 of the probe member 4 along with thermocouple junction 23. A plug member 27, having a tapered portion 28 at the base end thereof is adapted to be forcibly urged into the aperture 25 to thus secure the second thermocouple 21 therein, as shown. After the plug member 27 is inserted into the aperture 25, the end portion 29 (shown in phantom lines) must be removed to thus provide that the thermocouple junction 26 and distal end surface portions 30 are constructed and arranged in substantially flush relationship with respect to the inner surface portions 2 of the heated wall member 1. If so desired, a standard heat and electrical type insulating cement, such as a W. V. B. Copper Tech-G-Cement or an Armstrong C-4 cement, may be inserted into the aperture 25 prior to the insertion of the plug member 27 therein to thus affix the second thermocouple means 21 in set relationship with respect to the retaining structure. It should be further obvious that the thermocouple wires may also be coated with an insulative type metal oxide, such as magnesium oxide, in the conventional manner.

THEORY OF OPERATION (FIGS. 1–3)

With the above-discussed construction and arrangement of the heat flux probe assembly embodiment of FIGS. 1–3 it can be seen that the heat transfer occurring between thermocouple junctions 26 and 23 is maintained substantially one dimensionally in the direction of the axis X—X. It has been found that for most rocket engine applications the longitudinal distance between the two thermocouple junctions should comprise 1 to 5 inches. Such is basically true since the second portion 6 of the probe member 4 which contains such thermocouple junctions is relatively slender, i.e., considered to be infinitely longitudinal in configuration. The radial heat transfer is further eliminated by utilizing the hereinbefore described insulating means in the assembly structure and by constructing probe member 4 from the same material as that comprising the chamber wall 1. Also, it is desired in most applications to construct the plub member 27 from such a like material. Copper, for example, comprises the most workable constituent for most applications.

From the temperature history of the heated surface 30 of the probe assembly, the heat flux at such a surface may be computed with high accuracy by using known methods. Such is true primarily for the fact that the probe member 4 may be considered totally insulated for the above-stated reasons. Standard finite-difference equations may be programmed on a high-speed digital computer, and the temperature at any given time and location may then be computed as a function of the temperature distribution at a preceding time interval. The boundary conditions are the measured temperature histories of two independent points along a given radial path, plus an initial temperature distribution between the points. An equation may then be fitted to the temperature distribution and the derivative may be calculated at the heated surface. Finally, the heat flux can be determined from the following equation:

$$Q/A = -k\left(\frac{\partial T}{\partial x}\right)_{x=0} \qquad (1)$$

where:

$Q$ = heat flow (B.t.u./in.$^2$ sec.)
$A$ = area (in.$^2$)
$k$ = thermal conductivity of the particular metal
$T$ = temperature of the metal at a particular distance $x$ (° F.)
$x$ = distance measure along the axis of the probe (in.)

Since at least 0.5 sec. of rocket motor operation is required before a quasi-steady state is reached, there is a maximum heat transfer which can be recorded by the transient heat flux probe assembly of FIGS. 1–3. The basic problem is one of preventing melting or erosion at the heated surface portion 30 of the probe assembly before 0.5 sec. of operation has elapsed, for example. Copper, for example, has a relatively high heat capacitance. This particular metal can be safely heated at one surface thereof to approximately 1900° F. Assuming constant values of the heat transfer coefficient ($h_0$) and recovery temperature ($Tr$), a time-average heat flux of approximately 23.0 B.t.u./in.$^2$ sec. will raise the surface temperature of a copper probe from 70 to 1900° F. in 0.5 sec. and is an indication of the upper operating range of the uncooled probe.

The above described FIGS. 1–3 heat flux probe assembly embodiment comprises a transient or unsteady-state type of probe. Such a probe is relatively simple in construction and therefore relatively lower in cost than the hereinafter described FIGS. 4–6 embodiment. The probe shown in FIGS. 1–3 is particularly useful, as above-stated, with uncooled rocket motors or the like which require firing times in the range of 2 to 5 seconds. However, where a heat transfer measurement is to be taken on a rocket motor which has a firing duration greater than 5 seconds, the hereinafter described heat flux probe of FIGS. 4–6 is preferred.

The FIGS. 4–6 embodiment is of the steady-state type, i.e., a cooling means is used in combination therewith. As shown in FIG. 4, the steady-state type heat flux probe assembly is constructed and arranged in a manner similar to that of the hereinbefore described embodiment. A heated wall member 41 provides an inwardly facing surface 42 which functions to guide the hot gas flow as shown. An aperture 43 is formed in the wall member 41 and is adapted to retain a probe member 44 therein. The probe member 44 comprises an upper base type portion 45 and a lower probe extension portion 46. An upstanding, preferably cylindrical shaped, collar member 47 is adapted to be secured to the wall member 41 by means of a circumferentially extending weld head 48. The heat flux probe assembly may be retained therein by cooperative securing means in the form of removable pin members 49 which cooperate with the upper surface portion of base type portion 45, as shown. Other conventional securing means may be utilized in lieu thereof, if so desired. An O-ring gasket type member 50 may be utilized for sealing purposes and is retained in circumferentially extending groove 51 which is formed on the periphery of the probe member 44.

The heat transfer recording function may be readily achieved by means of substantially identical first and second thermocouple means 52 and 53, respectively. As more clearly shown in FIG. 5, the first thermocouple means 52, for example, is shown as comprising an insulated wire member providing a single wire element which is projected into a cutout portion 54 formed in the side wall of the probe extension portion 46 of the probe member 44. The wire filament member comprising the thermocouple means 52 and 53 may constitute constantan and the heat flux probe member 44 may be made of copper, for example. Other compatible, conventional thermocouple type materials may be used therefor. Subsequent to the insertion of the thermocouple means 52 and 53 into the cutout portions 54, a brazing type metal 55 may be employed to bond the filament member 53 in relatively fixed relationship with respect to the probe member 44. The brazing type metal 55 may, for example, be inserted into the cutout portions 54 in solid form. The thermocouple means 52 and 53 could then be inserted therein and the temperature of the assembly raised a sufficient amount to braze the thermocouple means to the probe member 44. It is desired that the brazing constituent 55 have electrical conducting properties substantially the same as the probe member 44 constituent, so as not to distract from the desired thermocouple functions.

FIGS. 4 and 6 disclose an inlet port 56 and an outlet port 57 which function to provide for a coolant flow. Inlet pipe 58 and exit pipe 59 cooperate with the inlet passage means 56 and outlet passage means 57, respectively. Thus, the portion 45 of probe member 44 may be maintained in a relatively steady-state condition by such a cooling means to provide for extended heat transfer calculations. In most design applications it is desired to construct and arrange the lowermost portion of the coolant passage at a distance $\partial$ from the heated surface portions of the probe in conformance with the following expression:

$$\partial = \frac{c}{Q/A} \text{ or } \partial = \frac{cA}{Q}$$

where:

$c$ = the product of the thermal conductance of the metal multiplied by the maximum heat differential occurring over the distance
$Q/A$ = the heat flux In most design applications the constant $c$ will quantitatively approximate seven.

A thermocouple wire 60 is brazed or welded in the conventional manner at 61 to the probe member 44 to provide for the heat transfer measuring thermocouple function in combination with the first thermocouple means 52 and second thermocouple means 53. For example, if the probe member 44 and the thermocouple wire 60 comprise a copper constituent and the filament members of both the first and second thermocouple means 52 and 53 comprise constantan, it can be readily seen that two thermocouple functions are completed. The two thermocouple functions occur whereat the constantan filament members contact the copper probe member 44 (FIG. 5).

FIG. 7 schematically discloses an electrical circuit measuring means which may be utilized for determining the heat transfer occurring between the thermocouple means 53 and 52 of the heat flux probe embodiment of FIGS. 4–6. As shown, the hot gas flow is adapted to heat an exposed surface 62 of the heat flux probe member 44 which is preferably in substantially flush relationship with respect to the inner surface 42 of the heated wall member 41. A preferably standard heat and electrical insulating means 63 may be used to fill the preferably cylindrically shaped chamber which is formed by means of the outer wall portions of the extension portions of the probe member 44 and the aperture 43 which is formed in wall member 41. For example, such an insulating constituent may comprise a metallic oxide such as aluminum oxide. For explanation purposes, it is stated that the temperature at the first thermocouple means 52 comprises $T_1$ and the temperature at the second thermocouple means 53 comprises $T_2$. As illustrated in FIG. 7, it has been found that by running two constantan wires through a cold junction and connecting the probe junction by means of copper wires to a recorder, the difference between the temperatures between $T_2$ and $T_1$ can be readily obtained. The copper thermocouple wire 60 is connected to a recorder which registers the temperature $T_2$, as shown.

THEORY OF OPERATION (FIGS. 4–7)

With the above-described FIGS. 4–7 heat flux probe assembly embodiment, it is obvious that a one dimensional type steady-state heat transfer measurement may be expeditiously obtained from Fourier's equation:

$$Q/A = k\frac{\Delta T}{\Delta x}$$

where the symbols have the same meaning as above assigned. Thus, the temperature difference occurring between two known points on the probe member 44 may be measured. Further, the gas side wall temperature may be calculated in the conventional manner and the desired heat transfer coefficient may be obtained. From the output of these thermocouples the temperature as well as the heat flux of the probe at any point on a radial line drawn through the thermocouples can be calculated. Further, as hereinbefore discussed, the apertures 54 whereat the first and second thermocouple means 52 and 53 are located may be drilled into the probe parallel to the generated isotherms so that conduction errors in the thermocouple wires can be reduced. Furthermore, by making the probe from substantially pure copper, a single constantan wire may be used to form the thermocouple junction, i.e., with the probe itself serving as a second thermocouple "wire." The coolant ports 56 and 57 which are at the unheated portion 45 of the probe 44 provide that a high and selectively varied coolant flow rate may be maintained to thus insure thermo-equilibrium in the probe within seconds after the commencement of engine combustion. The above-described FIGS. 4–7 embodiment is capable of indicating heat fluxes up to 20.0 B.t.u./in.$^2$-sec. under steady-state conditions.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A heat flux transducer assembly constructed and arranged on a longitudinal axis adapted to aid in the determination of a heat flow occurring through a heated wall member, said assembly comprising a probe member formed on said axis, securing means constructed and arranged on a first portion of said probe member for securing said probe assembly to said wall member, a second portion of said probe extending from and having a cross-sectional area which is substantially smaller than that of said first portion, a first thermocouple means constructed and arranged in said probe and terminating approximately at that portion of said probe member whereat the first and second portions thereof meet, a second thermocouple means constructed and arranged in an aperture formed on the longitudinal axis of said probe, said aperture terminating in an opening, and wedge means constructed and arranged in said aperture for closing said aperture at said opening and for fixedly wedging said second thermocouple means against said probe said probe member and said wedge means being constructed of a material having similar heat conducting properties to the material of said heated wall member.

2. A heat flux probe assembly constructed and arranged on a longitudinal axis in combination with a wall member, said wall member providing an inner surface thereon which is adapted to become heated and means forming an aperture therethrough substantially located on said axis, a cylindrically shaped support member secured to an outer surface portion of said wall member and including means forming an aperture therein on said axis, said probe assembly comprising a probe member formed on said axis and having a first portion thereof constructed and arranged adjacent to said support member, sealing means arranged between said first portion and said support member for preventing fluid flow thereby, cooperative securing means formed on said support member and said first portion for securing to and permitting removal of said probe assembly from said support member, said probe member further comprising a second portion which is slender in configuration relative to said first portion, said second portion extending from said first portion through the aperture formed in said support member and the aperture formed in said wall member, said second portion forming a chamber with the aperture formed in said support member and terminating in a surface portion which is in substantially flush relationship with respect to the inner surface of said wall member, means forming a first aperture through said probe member and substantially on the longitudinal axis thereof, means forming a second aperture in the first portion of said probe member and in substantially parallel relationship with respect to said first aperture, said second aperture terminating in exposed relationship with said chamber, a first thermocouple means arranged in said first aperture and terminating in a first thermocouple junction at the surface portion of said probe member which terminates at the inner surface of said wall member, a wedge means in said first aperture for securing said first thermocouple means therein, said wedge means providing a surface portion which is in substantially flush relationship with respect to the inner surface of said wall member, a second thermocouple means arranged in said second aperture and terminating in a second thermocouple junction which is at a fixed distance from said first thermocouple junction, said second thermocouple junction substantially located at that portion of said probe member whereat the first and second portions thereof meet and filling means securing said second thermocouple junction to said probe member, whereby a heat transfer measurement between said first and second thermocouple junctions may be effected said probe member and said wedge means being constructed of a material having similar heat conducting properties to the material of said heated wall member.

3. A heat flux transducer for measuring the rate of heat transfer from the inside surface to the outside surface of a wall and comprising a probe adapted to extend through the wall and having a base portion and an axially aligned elongate cylindrical extension portion integral with the base portion, the base portion being of larger cross-sectional size than said extension portion thereby defining a shoulder extending circumferentially around the said extension portion, the extension portion having a transversally extending distal end surface remote from said base portion to be disposed substantially flush with said inside surface, the probe having a first aperture with an outer end opening of the aperture being disposed in the surface of said base portion, said aperture extending through said base portion and longitudinally throughout said extension portion to said distal end surface, a first thermocouple of two wires and a junction, said wires extending longitudinally throughout said aperture and through said outer end opening for connection to an instrument responsive to the electrical potential between the wires for measuring said temperature, the wires extending to said junction flush in the said distal end surface, means for securing said junction in said aperture, the probe having a second aperture extending through said base portion and opening in said shoulder, a second thermocouple of two wires and a junction, said wires of said second thermocouple extending longitudinally throughout the said second aperture and through the outer end opening thereof for connection to said instrument, the wires of said second thermocouple extending to said junction proximate said shoulder, and a means for securing said second junction in said second aperture said probe being constructed of a material having heat conducting properties similar to the material of said wall.

References Cited by the Examiner

UNITED STATES PATENTS

| | | | |
|---|---|---|---|
| 1,431,212 | 10/1922 | Boyce | 73—347 |
| 2,546,415 | 3/1951 | Alcock | 73—362 |
| 2,642,737 | 6/1953 | Kinsella | 73—341 X |
| 2,798,377 | 7/1957 | Brownlee | 73—341 |
| 2,829,185 | 4/1958 | Macatician et al. | 73—359 |
| 3,018,663 | 1/1962 | Dunlop | 173—341 |

LOUIS R. PRINCE, *Primary Examiner.*

ISAAC LISANN, S. H. BAZERMAN,
*Assistant Examiners.*